United States Patent [19]

Hammerstrom

[11] 4,296,554
[45] Oct. 27, 1981

[54] TAPE MEASURE AND MARKING DEVICE

[76] Inventor: Everett A. Hammerstrom, 34016 Edmonton, Farmington Hills, Mich. 48024

[21] Appl. No.: 179,026

[22] Filed: Aug. 18, 1980

[51] Int. Cl.³ .......................... G01B 3/10; B43L 9/04
[52] U.S. Cl. ........................................ 33/138; 33/189
[58] Field of Search ................. 33/138, 137, 139, 140, 33/189, 27 C

[56] References Cited

U.S. PATENT DOCUMENTS 3,148,455  9/1964  Aciego ................................... 33/189
4,015,337  4/1977  Taylor .................................... 33/189

Primary Examiner—Harry N. Haroian

[57] ABSTRACT

A marking device for a measuring tape of the type carried in a housing, and which may include a spring return mechanism and a tape lock, includes a spring clip for attaching the tape to a belt or clothing, but in the present invention is also capable of and is adapted to receive and position a marking device, such as a pencil or scribing tool. The spring clip has two openings, one at the bend of the clip, and the second near the free end of the clip to engage the marking device and position it precisely in alignment with the point of exit of the tape from the housing.

The configuration of the clip allows the clip to be used to engage a brad or finishing nail in the second opening to retain the tape housing to a wall or other surface so that distances can be measured and easily and precisely marked by one person.

The invention also features a configuration at the end of the tape which allows the free end of the tape to be easily supported for the purpose of measuring and marking.

4 Claims, 5 Drawing Figures

TAPE MEASURE AND MARKING DEVICE

SUMMARY OF THE INVENTION

The tape measure and marking device of the present invention is especially adapted to solve problems when marking distances using a flexible measuring tape. Often a workman is called upon to mark distances larger than the span of his arms. The tape of this invention provides a simple, novel, and effective way of holding one end of the tape, or the tape housing itself, while the distance is determined and marked.

Measuring tapes and associated marking devices of the prior art are more complicated than the structure of this invention, and contain a larger number of parts, some moveable, making fabrication of the device exacting and expensive.

This invention utilizes a spring clip, similar to those found on commercially available tapes, which contains a 180-degree bend of a radius sufficiently large (1/16" to 3/16") that the spacing between the two portions of the bent spring clip will accomodate a workman's belt and the material of a wastband of a pair of trousers, approximately ⅛" to ⅜".

The clip differs from the commercially available article in two important respects. First, an opening in the bend portion allows a marking member such as a scribe or pencil to be inserted between the two portions of the clip, and another aperture, ovoid in shape and near the end of the clip remote from the housing, in combination with the shaping of the clip to curve away from the housing, acts to grasp and retain the marking member.

Secondly, the clip is positioned at an angle with respect to the bottom of the housing and the surface on which the measurement is being made, with the opening at the bend and the egg-shaped aperture holding the axis of the marking member in the exact direction of the line on which the tape exits from the housing.

This feature allows a measurement to be preset by extending the tape to the desired length and locking it in that position, without having to refer to the marking device acting at some other point than the exit point of the tape from the housing.

It has been found in practice that a clip of the configuration described can be used in conjunction with an ordinary finishing nail to hold the housing on a wall, floor or other surface, and the tape can be readily extended much greater distances than the span of a workman's arms, to the limit of the length of the tape.

The end of the tape which is pulled from the housing is provided with two notches and an aperture to interact with a small brad or finishing nail to enable the workman to secure the free end of the tape to allow measurements and markings to be made quickly, easily, and accurately, using the clip and marking device described above.

DETAILED DESCRIPTION OF THE INVENTION

The marking device for a measuring tape of this invention will now be described in conjunction with the accompanying drawing, wherein.

Figure 1:
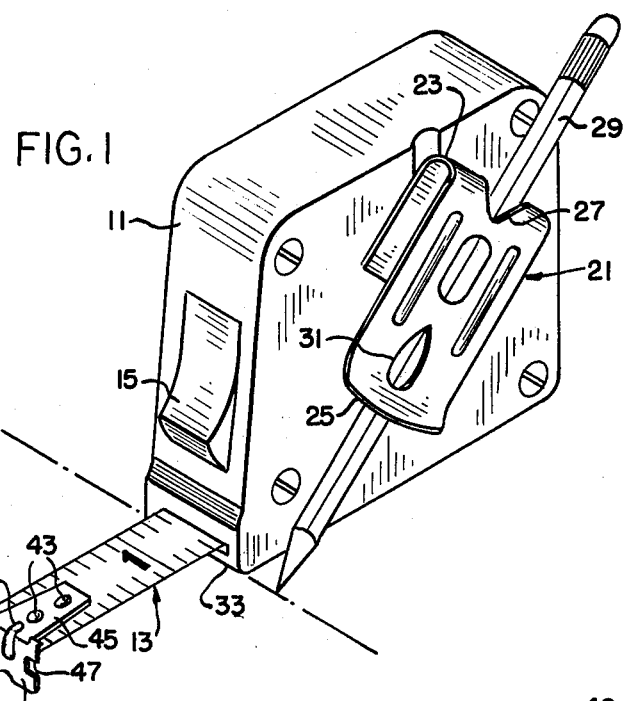
FIG. 1 is a perspective view of a measuring tape and marking device in accordance with this invention.

Referring now to FIG. 1, there is shown a measuring tape of conventional manufacture, having a housing 11, and a spring-returned measuring tape 13 in said housing, and provided with a tape lock 15.

According to the preferred embodiment of this invention, a spring clip 21 is secured to one side of the housing 11. The clip 21 has a 180-degree bend 23 with a radius of the order of 1/16" to ⅛" to allow the clip to fasten to the belt, pocket, or waistband of a workman's clothing. The end 25 of the spring clip 21 remote from the attachment of the clip 21 to the housing 11 is curved away from the portion attached to the housing 11.

The clip 21 has an opening or aperture 27 at the bend portion 23 to accomodate a marking member 29 such as a pencil or scribing tool. There is an additional aperture 31 in the clip 21 at the curved portion 25 which allows the marking member 29 to be securely held between the two portions of the clip 21, in a selected orientation with respect to the case or housing 11.

The aperture 31 at the curved end portion of the clip 21 has a configuration to embrace a round or polygonal-cross-sectional marking member 29, such as a pencil as shown in FIG. 1. The most common shape for the aperture 31, with a clip as shown in FIG. 1 and 2, would be egg-shaped or ovoid.

The center of the axis of the marking member 29 intersects the plane of the bottom of the housing 11 on the line that the tape 13 exits from the housing, indicated by the reference numeral 33 in the drawing. The marking member 29 thus will make a mark or scribe at the indicated measure of the tape 13, and it is not necessary for the user to add or subtract some distance from the indicated measurement.

Figure 2:
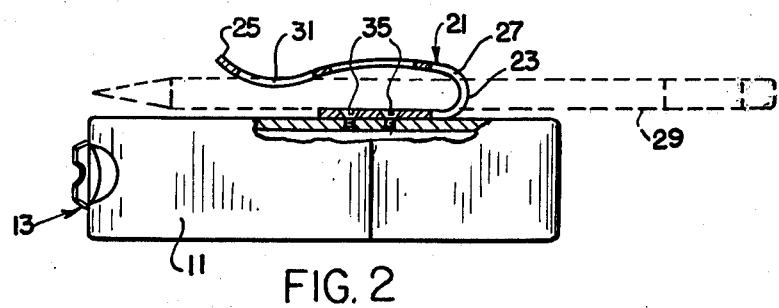
FIG. 2 is a view in section along the axis of the marking device of FIG. 1.

Referring now to FIG. 2, the configuration and positioning of the clip 21 with respect to the housing or case 11 can be seen and understood. The marking device 29 is securely held between the two portions of the spring clip 21, in cooperation of the opening 27 at the bend and the ovoid aperture 31.

The clip 21 is preferably secured to the housing 11 by means of permanent fastening devices, such as small machine screws 35 or rivets, to precisely align the clip 21 with respect to the line of exit 33 of the tape 13 from the housing 11.

Figure 3:
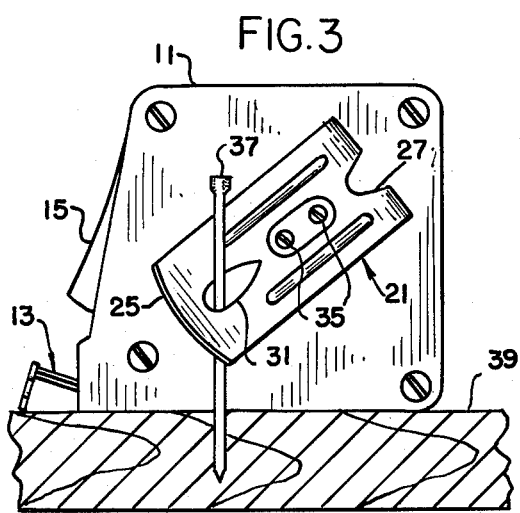
FIG. 3 is a side view of the invention in use.

FIG. 3 shows a recommended method of use of the invention to hold the housing 11 of the measuring tape while extending the tape for a measurement. The user can tap a finishing nail 37 into the work surface 39 and insert the finishing nail 37 through the aperture 31. A slight twist of the tape housing 11 will then bring the housing in alignment with the surface 39, and the spring clip will be placed in torsion. The spring action of the clip securely holds the housing 11 to the work surface 39, freeing the user to extend the tape 13 the desired amount.

Figure 4:
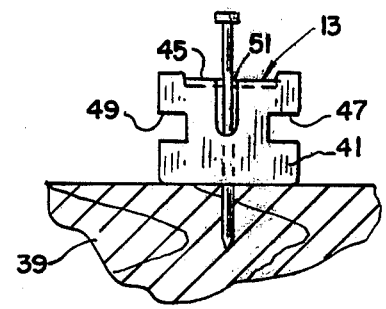
FIGS. 4 and 5 are end and top views of the tape, showing certain notches and apertures being used in accordance with the teachings of this invention.
Figure 5:
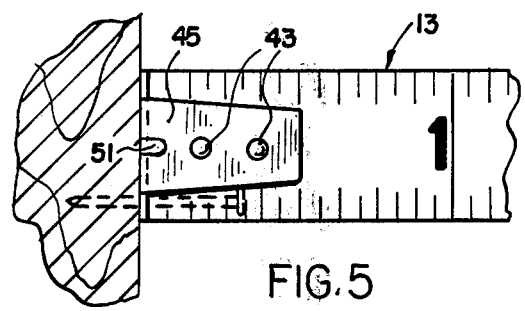

Referring now to FIG. 4 and 5, FIG. 4 is an end view of the tape 13 with a right-angle extension 41 secured to the tape 13 by rivets 43 through a Y-shaped yoke piece best seen through the showing of FIG. 5, a top view of the end of the tape, which yoke is denoted generally by the reference numeral 45. In the right-angle extension 41, notches 47 and 49 have been provided on each side of the right-angle extension. These notches 47 and 49 are adapted to engage a brad or finishing nail, or any other protrusion from a measuring point, to hold up the free end of the tape 13, and allow a measurement to be marked from the housing end of the tape in the manner explained above in conjunction with FIGS. 1 and 2.

In addition to the notches 47 and 49, the end of the tape 13 can be supported or restrained by a nail or protrusion through an aperture 51 through both the yoke 45 and the tape 13.

The tape in accordance with this invention ca be used to scribe arcs and circles of precise radius by the use of a small nail, pick, or awl through the aperture 51 to serve as the center of the arc or circle. The desired measurement can then be set by the use of the rule lock, and the pencil or scribing tool will make the mark according to the exact length of the tape indicated at the exit line 33.

Modifications of the specific showing of this specification are deemed within the scope of the claims set forth below.

I claim:

1. A marking device for a measuring tape of the type carried in a housing with the tape coiled inside, comprising:
    a spring clip attached at one end to the side of the housing,
    said spring clip having a 180-degree bend adapted to engage the belt, a pocket, or edge of clothing,
    a marking member,
    said spring clip having an opening adapted to receive said marking member in the bend portion thereof,
    said clip further having an ovoid aperture in the end removed from the end attached to said housing, and being adapted to engage said marking member when inserted through said opening,
    said spring clip further being curved at said ovoid aperture away from the end attached to said housing,
    said spring clip being fixed to said housing at an angle to position said marking member engaged within said opening and said ovoid aperture in alignment with the point on said housing where said tape exits from said housing.

2. In combination with a housing for a coiled measuring tape having an exit opening for the tape,
    a spring clip having a bend of 180 degrees and having one end attached to said housing, said bend having a radius of the order of 1/16" to 3/16",
    an opening in said bend adapted to receive a marking member and an ovoid aperture near the end of said clip opposite from said attachment to said housing adapted to engage said marking member by spring action,
    a portion of said spring clip being curved away from said housing to facilitate said clip engaging a belt or clothing,
    the angle of said clip with respect to said housing being that which aligns the axis of said marking member with said exit opening for said tape from said housing.

3. In combination with a marking device for a measuring tape as claimed in claim 1 or 2,
    a member attached to the end of the tape having a right-angle bend with respect to the extension of said tape,
    the portion of said member at right angles to said tape having a notch on each side thereof capable of admitting a small brad or nail to retain the end of said tape.

4. In combination with a marking device for a measuring tape as claimed in claim 1 or 2,
    a member attached to the end of the tape having a right-angle bend with respect to the extension of said tape,
    the portion of said member at right angles to said tape having a notch on each side thereof,
    and a hole through said member and said tape transverse to said tape and said member adjacent the end thereof.

* * * * *